(12) United States Patent
Labordus

(10) Patent No.: US 11,939,038 B2
(45) Date of Patent: Mar. 26, 2024

(54) FUSELAGE STRUCTURE OF AN AIRCRAFT AND METHOD FOR MANUFACTURING THE SAME

(71) Applicant: KOK & VAN ENGELEN COMPOSITE STRUCTURES B.V., The Hague (NL)

(72) Inventor: Maarten Labordus, Delft (NL)

(73) Assignee: KOK & VAN ENGELEN COMPOSITE STRUCTURES B.V., The Hague (NL)

(*) Notice: Subject to any disclaimer, the term of this patent is extended or adjusted under 35 U.S.C. 154(b) by 200 days.

(21) Appl. No.: 17/625,203

(22) PCT Filed: Jun. 25, 2020

(86) PCT No.: PCT/NL2020/050419
§ 371 (c)(1),
(2) Date: Jan. 6, 2022

(87) PCT Pub. No.: WO2021/006725
PCT Pub. Date: Jan. 14, 2021

(65) Prior Publication Data
US 2022/0258847 A1    Aug. 18, 2022

(30) Foreign Application Priority Data

Jul. 8, 2019   (NL) .................................... 2023459

(51) Int. Cl.
*B64C 1/12* (2006.01)
*B29C 65/36* (2006.01)
(Continued)

(52) U.S. Cl.
CPC ............ *B64C 1/12* (2013.01); *B29C 65/3636* (2013.01); *B29C 65/3684* (2013.01);
(Continued)

(58) Field of Classification Search
CPC ........... B64C 1/068; B64C 1/069; B64C 1/12; B64C 3/26
See application file for complete search history.

(56) References Cited

U.S. PATENT DOCUMENTS 3,735,596 A * 5/1973 Stephenson ......... E04D 13/0641
52/630
4,310,132 A * 1/1982 Frosch .................... B64C 1/068
244/119
(Continued)

FOREIGN PATENT DOCUMENTS

EP      4112279 A1 *  1/2023
FR      2943944 A1 * 10/2010 ............. B29C 70/30
(Continued)

OTHER PUBLICATIONS

International Search Report and Written Opinion for the International Patent Application No. PCT/NL2020/050419, dated Sep. 7, 2020, 14 pages.
(Continued)

*Primary Examiner* — Joseph W Sanderson
(74) *Attorney, Agent, or Firm* — KDW Firm PLLC

(57) ABSTRACT

A fuselage structure of an aircraft includes a fuselage skin, and a plurality of frame elements spaced apart from one another in a direction parallel to the aircraft longitudinal axis for supporting the fuselage skin. The fuselage skin includes a plurality of interconnected fiber-reinforced composite skin panels that extend between each pair of frame elements and are connected thereto. The composite skin panels further comprise a stiffener integrally formed in each composite skin panel. A method for manufacturing the fuselage skin. The composite skin panels may be interconnected and/or connected to a frame element through an induction welded connection.

13 Claims, 5 Drawing Sheets

(51) Int. Cl.
  *B29D 99/00* (2010.01)
  *B29L 31/30* (2006.01)
  *B64C 1/06* (2006.01)
  *B64C 1/00* (2006.01)
(52) U.S. Cl.
  CPC .......... *B29D 99/0014* (2013.01); *B64C 1/061* (2013.01); *B64C 1/064* (2013.01); *B64C 1/069* (2013.01); *B29L 2031/3082* (2013.01); *B64C 2001/0072* (2013.01)

(56) References Cited

U.S. PATENT DOCUMENTS

| | | | | |
|---|---|---|---|---|
| 8,398,024 B2* | 3/2013 | Tucker | ...................... | B64C 3/18 244/123.1 |
| 8,480,031 B2* | 7/2013 | Gauthie | .................. | B64C 1/064 244/131 |
| 8,985,515 B2* | 3/2015 | McCullough | ........ | B29D 99/001 244/131 |
| 9,371,125 B2* | 6/2016 | Gallant | .................... | B64C 1/061 |
| 9,676,469 B2* | 6/2017 | Benner | .................... | F02K 1/04 |
| 10,611,455 B2* | 4/2020 | Guilloteau | ............. | B64C 1/061 |
| 11,040,769 B2* | 6/2021 | Schrauf | .................... | F15D 1/12 |
| 11,325,689 B2* | 5/2022 | Cheng | .................... | B32B 3/263 |
| 11,383,818 B2* | 7/2022 | Vichniakov | ............. | B29C 66/43 |
| 11,420,719 B2* | 8/2022 | Rack | ......................... | B64C 3/26 |
| 2009/0200423 A1* | 8/2009 | Tucker | ...................... | B64C 3/26 244/123.1 |
| 2010/0258676 A1* | 10/2010 | Gauthie | .................. | B64C 1/069 244/131 |
| 2011/0052845 A1 | 3/2011 | Dermond | | |
| 2012/0025022 A1* | 2/2012 | Buchs | ................... | B29C 66/131 244/129.5 |
| 2012/0104170 A1* | 5/2012 | Gallant | ...................... | B64C 1/12 244/132 |
| 2013/0026297 A1* | 1/2013 | McCullough | ............. | F16B 5/12 244/131 |
| 2015/0291271 A1* | 10/2015 | Benner | ................... | B64C 1/069 403/376 |
| 2018/0148155 A1* | 5/2018 | Guilloteau | ............. | B64C 1/069 |
| 2019/0016444 A1* | 1/2019 | Schrauf | ..................... | B64C 5/02 |
| 2019/0241245 A1* | 8/2019 | Rack | ......................... | B64C 3/26 |
| 2019/0283856 A1* | 9/2019 | Clapp | ........................ | B32B 7/12 |
| 2019/0367147 A1* | 12/2019 | Vichniakov | ............. | B29C 65/18 |
| 2020/0354036 A1* | 11/2020 | Cheng | ....................... | B64C 1/00 |

FOREIGN PATENT DOCUMENTS

| | | |
|---|---|---|
| GB | 759529 A | 10/1956 |
| WO | 2011001050 A1 | 1/2011 |

OTHER PUBLICATIONS

International Preliminary Report on Patentability for the International Patent Application No. PCT/NL2020/050419, dated Oct. 13, 2021, 19 pages.

M. Dubé, P. Hubert, A. Yousefpour, J. Denault, "Resistance welding of thermoplastic composites skin/stringer joints" Composites Part A: Applied Science and Manufacturing, vol. 38, Issue 12, 2007, pp. 2541-2552.

* cited by examiner

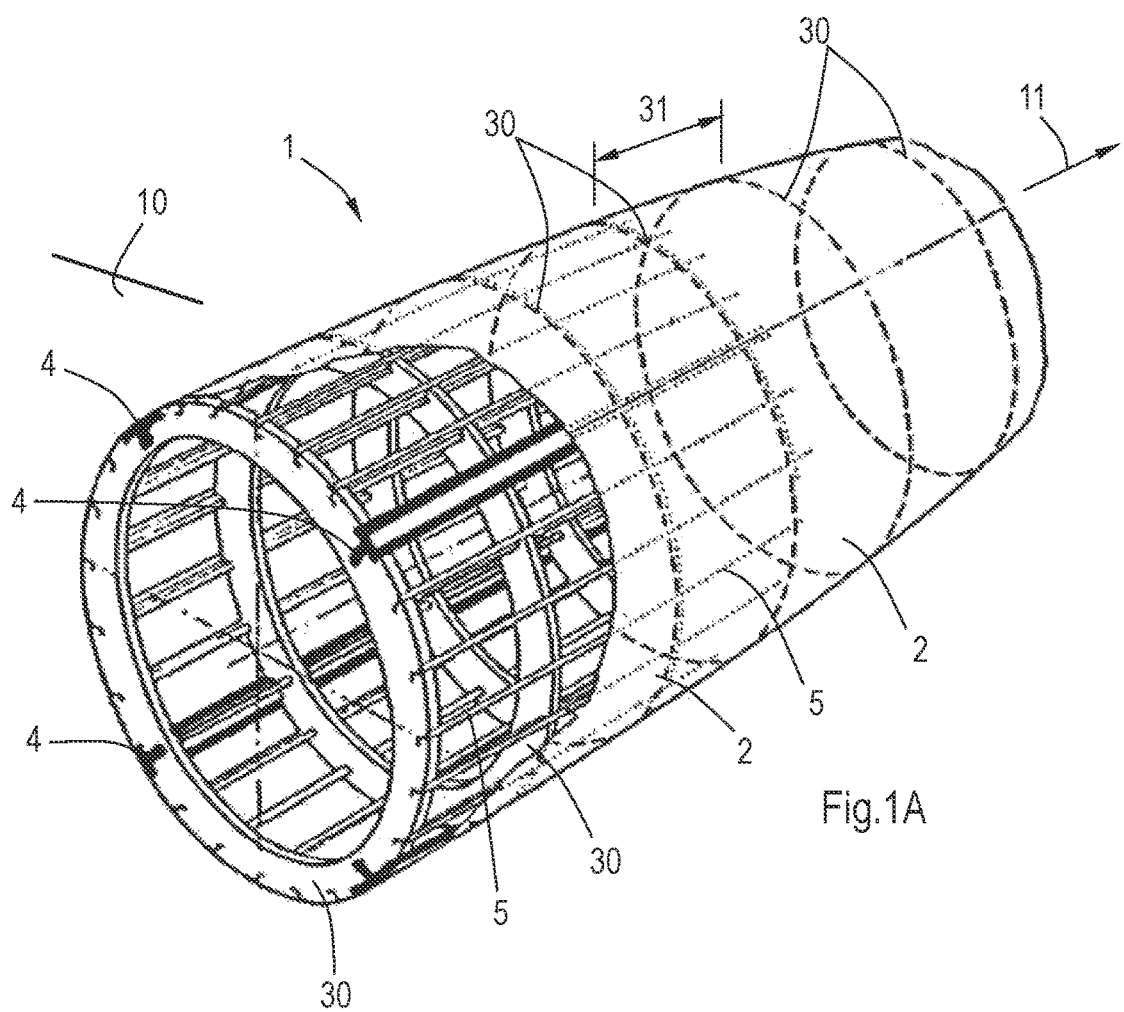
Fig.1A
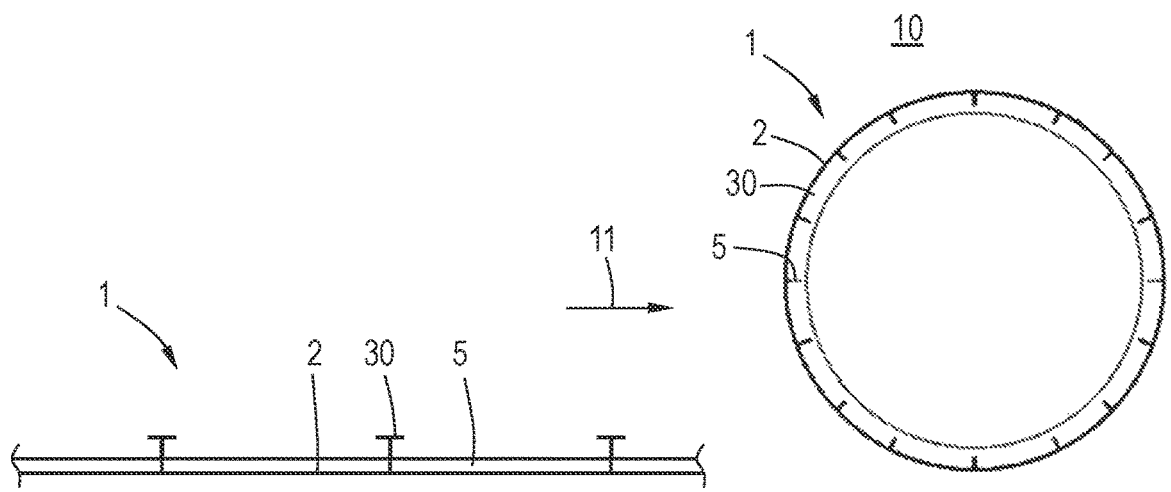
Fig.1B
Fig.1C

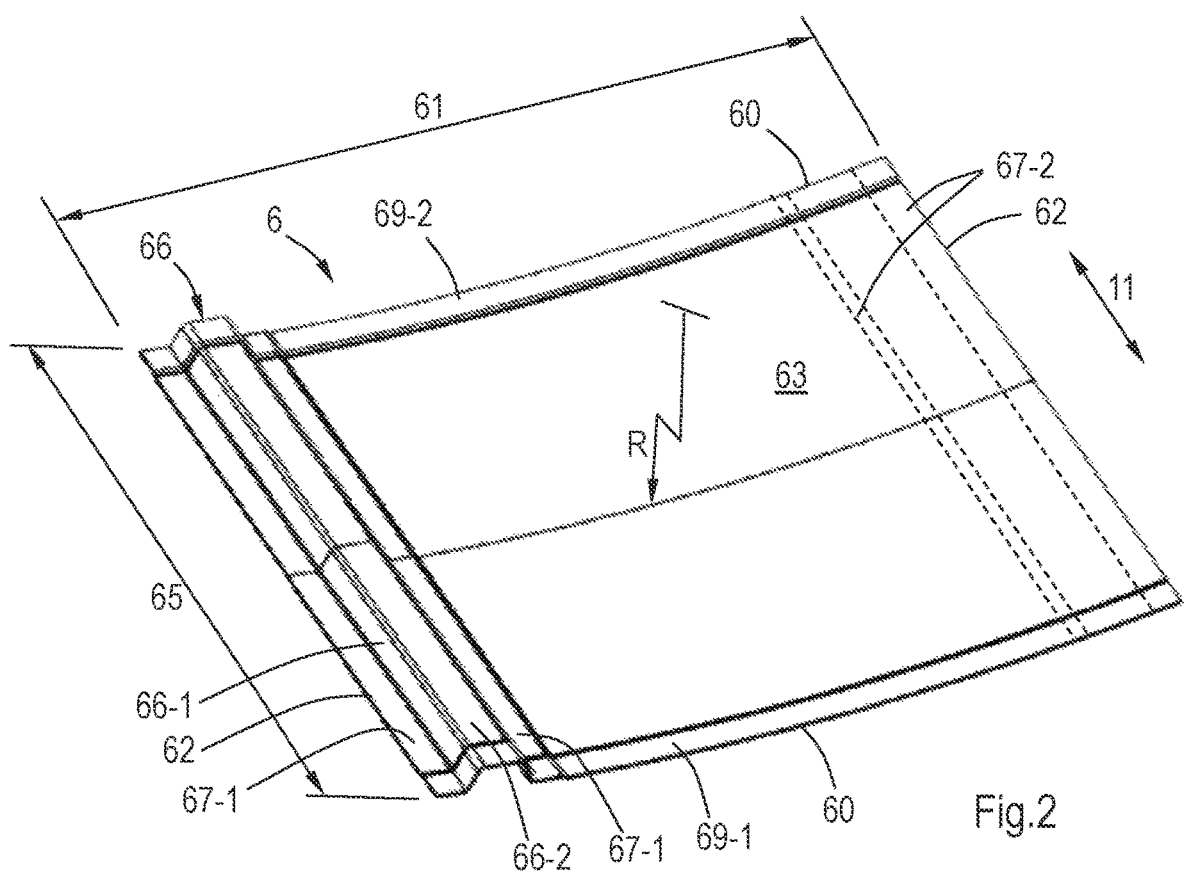
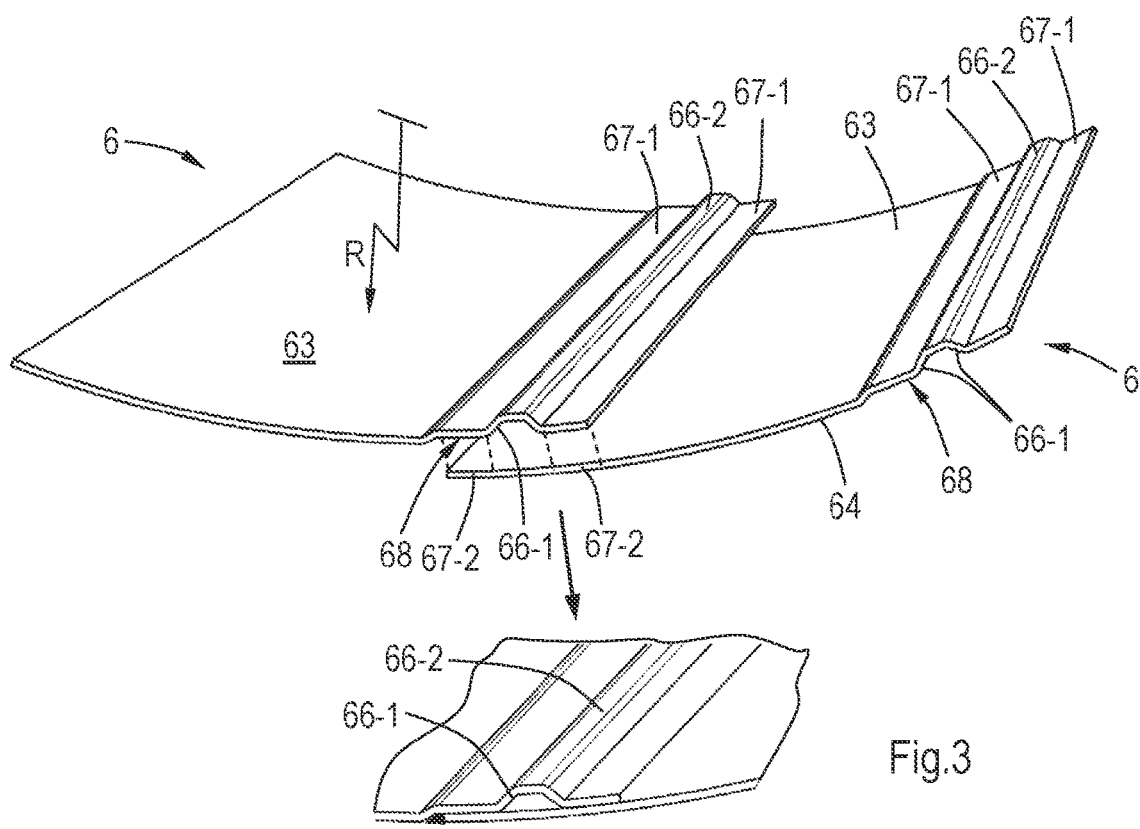

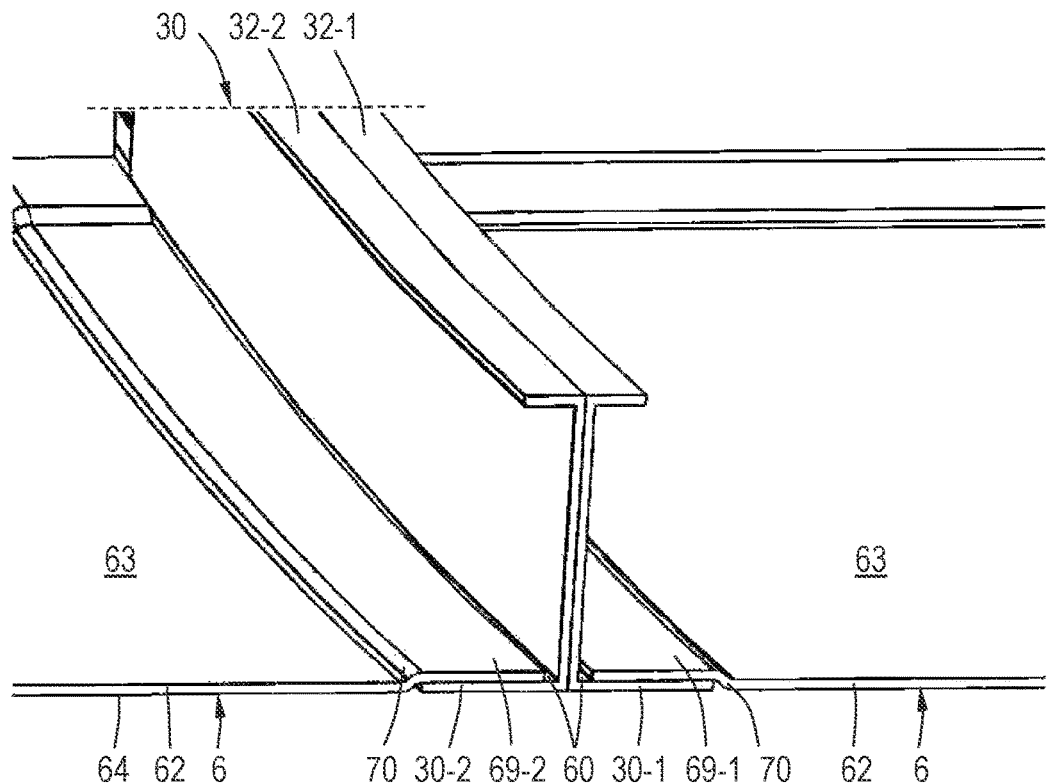
Fig.4
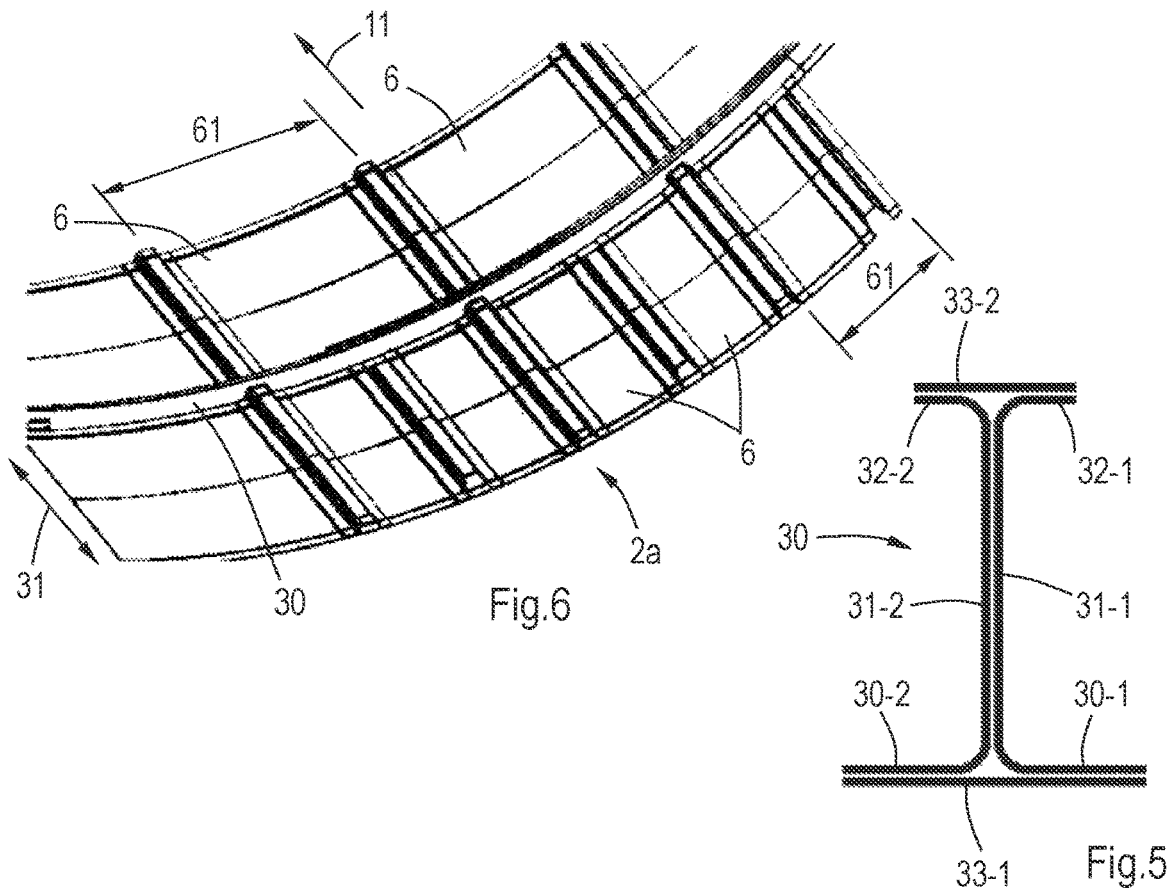
Fig.6
Fig.5

120 # FUSELAGE STRUCTURE OF AN AIRCRAFT AND METHOD FOR MANUFACTURING THE SAME

This application is a national stage filing under 35 U.S.C. 371 of pending International Application No. PCT/NL2020/050419, filed Jun. 25, 2020, which claims priority to Netherlands patent application serial number 2023459, filed Jul. 8, 2019, the entirety of which applications are incorporated by reference herein.

TECHNICAL FIELD OF THE INVENTION

The invention relates to a fuselage structure of an aircraft and to a method for manufacturing the same. The invention further relates to a method for connecting a plurality of fiber-reinforced composite skin panels to each other and/or to a frame element of a fuselage to form an integrated fuselage skin part.

BACKGROUND OF THE INVENTION

Aircraft comprise vehicles that are able to take flight for extended periods of time. Airliners are designed to carry passengers or cargo for commercial purposes. Typically, modern airliners classify as heavier-than-air, fixed-wing aircraft because of their geometry and functionality. The aircraft's lifting force is generated by wings, fixed to the structure, and airspeed is required to create lift. An aircraft is subject to many different load cases, with some peak loads dominated by dynamic behavior, for instance due to atmospheric disturbances. The predominant structure of an aircraft to absorb these loads has barely changed through the years. Modernization has merely led to optimized structures and materials, generally aiming at a potentially lower mass.

The predominant fuselage structure of an aircraft comprises an outer fuselage skin, extending along a longitudinal axis of the aircraft and enclosing an inner space, and a plurality of frame elements spaced apart from one another in a direction parallel to the aircraft longitudinal axis and extending in a circumferential direction along an inner surface of the fuselage skin to support the fuselage skin. In this so-called semi-monocoque design, the fuselage skin takes a majority of the load and represents the stressed component of the structure. The frame elements (or formers) provide the shape of the fuselage and additional stringers and stiffeners may be used to stabilize the fuselage skin and add additional strength and stiffness to the structure. The skin-stringer-frame construction is typically used in modern aircraft, in particular in airliners. For the comfort of the passenger, the air pressure inside the cabin is artificially maintained at a higher pressure than the pressure at the outside of the aircraft at flight altitude. This means that the pressure at the inside is higher than at the outside, so effectively, the fuselage skin is loaded like a pressure vessel. This means that the skin is peeled away from the circumferential frames. Most composite joining methods like adhesive joining or welding exhibit a poor strength under this loading condition, while similar joints under a shear load show a much higher load carrying capacity.

In the aviation industry, the weight of an aircraft plays a very important role. The difference between the empty operating weight (EOW) and the maximum take-off weight (MTOW) determines the margin available for carrying paid cargo and fuel. Also, the weight of an aircraft directly influences the amount of drag it creates during flight and thus the amount of fuel used to counter the drag forces. Reducing the weight of an aircraft increases the weight margins and reduces the operating costs. Though significant, the prospect of a weight reduction does not always convince an aircraft manufacturer to adopt a new design or technology. New technologies often bring disadvantages such as high production costs, complicated maintenance procedures and decreased damage tolerance. For this reason, most modern aircraft is still built using conventional materials, such as aluminum, with old, but proven, technologies.

The introduction of composites in aircraft structures has led to more flexibility in design shapes and a decrease in airframe mass. However, the cost of manufacturing and certification of composite aircraft is ever increasing. Most methods for producing an airliner fuselage require an autoclave, and very large molds that must withstand the high temperatures and pressures that are used inside the autoclave. When thermosetting composite materials are used, co-curing of all parts simultaneously is preferred over a step-by-step bonding process wherein the structure is gradually built up, largely because of stricter certification requirements for the latter method. Co-curing makes for complex and expensive tooling and equipment.

Also, typical composite fuselage skins are vulnerable to skin delamination. Indeed, the relatively stiff frame elements resist the expansion of the fuselage skin under cabin pressure, and therefore induce relatively large delamination stresses.

SUMMARY OF THE INVENTION

The present invention aims at providing a fuselage structure of an aircraft that may be manufactured efficiently and at a potentially lower cost than the known fuselage structure, and yet provides a fuselage structure with improved delamination resistance. The invention thereto provides a fuselage structure of an aircraft in accordance with the appended claim 1. The fuselage structure comprises a fuselage skin, extending along a longitudinal axis of the aircraft and enclosing an inner space, further having an inner surface facing the inner space, a plurality of frame elements spaced apart from one another in a direction parallel to the aircraft longitudinal axis and extending in a circumferential direction along the inner surface of the fuselage skin to support the fuselage skin, wherein the fuselage skin comprises a plurality of interconnected fiber-reinforced composite skin panels that extend between each pair of frame elements and are connected thereto by joined first wall parts of a composite skin panel and a frame element, wherein the composite skin panels further comprise a stiffener formed in each composite skin panel and extending radially inwards from the inner surface, wherein the stiffeners extend in a direction parallel to the aircraft longitudinal axis.

According to the invention, an entire fuselage skin is built up by interconnecting a plurality of fiber-reinforced composite skin panels that are further connected to the frame elements of the fuselage structure. Since the panels are of relatively small size, they may be manufactured with efficient methods such as compression molding. The fuselage structure therefore does not need to be assembled entirely and provided in an autoclave for curing, but may be assembled outside such an autoclave. Since the panels are relatively small, compared to the known fuselage skin panel, expensive molds and other tooling is not required either.

It goes without saying that the fuselage structure may be connected to other structures of the aircraft, such as a floor structure arrangement for instance comprising a floor panel, extending in a plane parallel to the aircraft longitudinal axis, a multiplicity of floor support beams, extending along a lower surface of the floor panel and perpendicular to the aircraft longitudinal axis, and a multiplicity of floor support struts, extending from the floor support beams at the lower surface of the floor panel to the frame elements to which they are connected.

A preferred embodiment of the invention provides a fuselage structure, wherein the first wall part of the composite skin panel is located more radially inwards than the first wall part of the frame element to which it is joined. When pressurizing the fuselage skin, the first wall parts of the composite skin panels that make up the fuselage skin will be pushed against the first wall parts of the frame elements to which they are connected due to unfavorable peel-loads. This will largely prevent the composite skin panels from becoming detached from the first wall parts of the frame elements to which they are connected. This embodiment thus provides an increased delamination resistance of the fuselage skin compared to an embodiment in which the first wall part of the composite skin panels would be located more radially outwards than the first wall part of the frame elements to which they are joined.

The joined first wall parts of the composite skin panels and the frame elements may be selected at appropriate positions of the composite skin panels and the frame elements, depending for instance on loading conditions and design considerations.

An embodiment of the invention provides a fuselage structure wherein the frame elements have an I-shaped or H-shaped cross-section, and the first wall part of the frame element comprises a flange of the I- or H-shaped frame element. In this embodiment, the composite skin panels and the frame elements are connected to each other by joining first wall parts of the composite skin panels to a flange of the I- or H-shaped frame element. To prevent delamination, the first wall part of the composite skin panels is preferably located more radially inwards than the flange of the frame elements to which they are joined.

Another preferred embodiment provides a fuselage structure wherein the first wall part of the composite skin panel comprises a side edge joggle provided at a side edge of the composite skin panel, the side edge joggle permitting the first wall part of the frame element to overlap the composite skin panel's first wall part while maintaining a flush outer surface of the fuselage skin. This embodiment improves the aerodynamic behavior of the fuselage structure by providing a relatively smooth outer surface of the fuselage skin.

The connection between a composite skin panel and another composite skin panel may be achieved by any means known in the art. Such connection between a composite skin panel and another composite skin panel comprises joined second wall parts of both, wherein the joined second wall parts of the composite skin panels may be selected at appropriate positions of the composite skin panels, depending for instance on loading conditions and design considerations. An embodiment, in which the second wall part of one composite skin panel comprises a joggle adjacent to the stiffener, the joggle permitting the second wall part of the composite skin panel to overlap with the other composite skin panel's second wall part while maintaining a flush outer surface of the fuselage skin, is particularly preferred.

A number of technologies exist for joining composite skin panels to each other and/or to frame elements of the fuselage structure. Mechanical fastening and adhesive bonding may for instance be used to join two contact surfaces of the panels and/or frame elements. However, both mechanical fastening and adhesive bonding appear to be costly and time consuming. Mechanical fastening for instance requires expensive hole locating, drilling, shimming, and fastener installation, while adhesive bonding requires complicated surface pre-treatments that may involve chemical substances.

An embodiment that addresses the above disadvantages of traditional bonding provides a fuselage structure wherein some or all of the first wall parts are joined through an induction welded connection.

In another embodiment, a fuselage structure is provided wherein some or all of the second wall parts of the composite skin panels are joined through an induction welded connection.

Electromagnetic welding may be the method of choice, as will be elucidated further below.

Each composite skin panel is provided with an integrated stiffener by which is meant that the stiffener forms an integral part of the composite skin panel. Each composite skin panel is manufactured to comprise the stiffener, in contrast to a situation in which a stiffener is applied onto a molded composite skin panel. An embodiment according to the invention provides a fuselage structure wherein the stiffeners of composite skin panels are aligned with one another in the direction parallel to the aircraft longitudinal axis. In this embodiment, the stiffeners of a plurality of composite skin panels, arranged adjacently and parallel to the longitudinal axis of the aircraft, extend along a common line that runs parallel to the aircraft longitudinal axis.

Another embodiment that provides improved mechanical properties, relates to a fuselage structure wherein the stiffeners of composite skin panels are connected to each other to form a continuous stringer. The continuous stringer extends along a line that runs parallel to the aircraft longitudinal axis. As with the composite skin panels and the frame elements, a fuselage structure wherein the stiffeners are connected through an induction welded connection, is preferred.

The fuselage structure according to an embodiment of the invention comprises a composite fuselage skin that is closed in the circumferential direction.

As will be further elucidated below, an embodiment of the invention preferably provides a fuselage structure wherein the frame elements are made of a fiber-reinforced composite, more preferably wherein the fiber-reinforced composite skin panels and/or the frame elements are made of a fiber-reinforced composite material having a thermoplastic matrix.

Another aspect of the invention provides an aircraft comprising the invented fuselage.

Yet another aspect of the invention relates to a method for manufacturing a fuselage structure of an aircraft. The method comprises the steps of:
  providing a plurality of frame elements spaced apart from one another in a direction parallel to a longitudinal axis of the aircraft and extending in a circumferential direction of the aircraft;
  providing a plurality of fiber-reinforced composite skin panels to extend between each pair of frame elements, such that a stiffener formed in each composite skin panel extends radially inwards from an inner surface of each composite skin panel and in a direction parallel to the aircraft longitudinal axis;
  interconnecting the plurality of fiber-reinforced composite skin panels by joining second wall parts of composite skin panels; and to form an integrated fuselage skin part between each pair of frame elements;

connecting the plurality of fiber-reinforced composite skin panels to each pair of frame elements by joining first wall parts of each composite skin panel and each frame element; and repeating the above steps for each pair of frame elements until a fuselage skin is formed, extending along a longitudinal axis of the aircraft and enclosing an inner space thereof, and being supported by the plurality of frame elements.

In an embodiment of the invention, a method is provided wherein the first wall part of the composite skin panel is located more radially inwards than the first wall part of the frame element to which it is joined.

In yet another embodiment of the invented method, the frame elements have an I-shaped or H-shaped cross-section, and the first wall part of the frame element comprises a flange of the I- or H-shaped frame element.

Yet another embodiment provides a method wherein the first wall part of the composite skin panel comprises a side edge joggle provided at a side edge of the composite skin panel, and the first wall part of the frame element is brought in overlapping arrangement with the composite skin panel's first wall part to permit maintaining a flush outer surface of the fuselage skin.

Another useful embodiment is provided by a method wherein a composite skin panel is connected to another composite skin panel by joining second wall parts of both, wherein the second wall part of a composite skin panel comprises a side edge joggle provided at a side edge of the composite skin panel, and the second wall part of the other composite skin panel is brought in overlapping arrangement with the composite skin panel's second wall part to permit maintaining a flush outer surface of the fuselage skin.

In an embodiment of the invented method, the stiffeners of composite skin panels are aligned with one another in the direction parallel to the aircraft longitudinal axis, and more preferably, are connected to each other to form a continuous stringer.

In a practical embodiment of the method, a plurality of fiber-reinforced composite skin panels is provided until the composite fuselage skin is closed in the circumferential direction. The number of fiber-reinforced composite skin panels between each pair of frame elements depends on the size of the aircraft, and may typically range from 10 to 200, and more, composite skin panels. Dimensions of the fiber-reinforced composite skin panels are generally smaller than the known fuselage skin sections. Side dimensions of the composite skin panels may range from 0.1-5 m, more preferably from 0.4-4 m, even more preferably from 0.6-3 m, even more preferably from 1.0-2.0 m. The number of frame elements along the longitudinal axis of the aircraft also depends on the size of the aircraft, and may typically range from 5 to 50 and more, frame elements. A total number of composite skin panels that builds up the fuselage skin may therefore typically range from 50 to 1000, and more.

In preferred methods, some or all of the first wall parts of the composite skin panels and the frame elements are joined through an induction welded connection, and/or some or all of the second wall parts of the composite skin panels are joined through an induction welded connection. In another embodiment of the method, the stiffeners of adjacently positioned composite skin panels are also connected through an induction welded connection.

Such an induction welded connection may be provided, according to an embodiment of the invention, by a method comprising electromagnetic welding. In such a method, joining the first and/or second wall parts is achieved by pressurizing contact surfaces of the first and/or second wall parts to be joined, moving an inductor along the pressurized contacted surfaces of the first and/or second wall parts, generating an electromagnetic field in an induction-sensitive component of the first and/or second wall parts to heat a thermally activated coupling means of the first and/or second wall parts to above a melting temperature of the coupling means, and connecting the contact surfaces of the first and/or second wall parts to each other by the molten coupling means.

A number of welding methods are available for creating a welded connection between molded parts such as the fiber reinforced composite skin panels. In vibration welding the reinforcing fibers may be damaged by the movement, and ultrasonic welding may be less suitable for continuous welding.

Electromagnetic welding may eliminate the use of separate fasteners and potentially offers the ability to join contact surfaces of molded composite parts at relatively high speeds and little, if any, pre-treatments. Electromagnetic welding generates an electromagnetic field in an induction-sensitive component of one or more of the molded part(s) to heat a thermally activated coupling means of the molded part(s) to above a melting temperature of the coupling means. The contact surfaces of the molded parts are joined to each other by the molten coupling means. The coupling means may for instance be a thermoplastic resin of one or more of the parts to be joined, or may be a separately applied thermoplastic resin. For welding thermoplastic and thermoset molded parts together, the thermoplastic resin that the induction-sensitive component melts may function as a hot melt adhesive for instance.

A preferred embodiment provides a method wherein the first and/or second wall parts are made of a fiber-reinforced composite material having a thermoplastic polymer matrix, and the thermally activated coupling means comprises the thermoplastic polymer matrix. Another embodiment provides a method wherein the induction-sensitive component is selected from carbon fibers, a metal or metal mesh, ferromagnetic particles, or combinations of these.

In order to be able to achieve an adequate quality weld with electromagnetic welding, it is generally required to apply sufficient pressure on the contacted surfaces of the first and/or second wall parts that need to be connected by welding. Applying pressure to the contacted surfaces may for instance be based on the use of inflatable elements that transfer pressure on the components to be joined by welding. The inflatable elements may be enclosed in a mold cavity which is only open on the side where the pressure has to be exerted. Inflatable bodies may comprise silicone hoses that radially expand when inflated, but other solutions are also possible.

The tooling for pressurizing the contacted surfaces may comprise pressurizing means for pressurizing the inflating means and applying pressure to the contacted surfaces. A useful embodiment provides a tooling wherein the pressurizing means comprises channeling provided in a stiff body, which channeling at one end is connected to a pressure source and at another end connects to the inflating means. Although the pressurizing medium may be chosen at will, a liquid or a gas is preferred. In an embodiment, a tooling is provided wherein the pressure source comprises a source of pressurized air.

Electromagnetic welding heats up metallic parts that are within reach of the inductor, and of its induced electromagnetic field. This may not be preferred in some embodiments, and an embodiment of the tooling wherein the stiff body is made from a polymeric material is preferred. Any polymeric material may be used, with a preference for polymeric materials with a relatively good resistance against high temperatures in the range of 150-300° C. Examples of such materials are PEEK and PEKK, but thermosetting materials may also be used, such as epoxide, bismaleimid resins and the like. When using thermosetting resins, an additional coupling means, for instance an insert of a thermoplastic polymer, is preferably provided in the contacted surfaces.

An inductor typically comprises an electrical conductor which, under alternating voltage, generates an electromagnetic field. The shape of the electromagnetic field may be any known shape, such as coiled, or substantially cylindrical in a direction of welding. The use of a substantially cylindrical electromagnetic field in the welding direction enables very controlled, uniform and targeted heating, so that overheating is prevented as far as possible. Overheating may result in degradation of material, and thereby cause undesirable weakening of the construction. Other inductors comprise a plurality of windings, which produces a torus-shaped electromagnetic field. By using such a known inductor with the direction at right angles to the inductor as direction of induction, a heating pattern is created in which a relatively cold zone occurs in the center. The cylindrical electromagnetic field on the other hand produces a much more favorable heating profile which enables uniform heating. A cylindrical electromagnetic field can moreover be made very narrow, up to a width of 10-20 mm. In torus-shaped fields such a width cannot be realized in combination with the required heat-inducing power and penetration.

The electromagnetic field of the inductor may reach the contacted surfaces between the first and/or second wall parts directly, through sections of the first and/or second wall parts, and/or through a wall of a mold. The invented method makes it possible to realize a good-quality welded connection or joint between the first and/or second wall parts in a rapid and efficient manner, without having to use sturdy and heavy tooling. A fuselage skin assembled by the plurality of welded composite skin panels has a surprisingly good mechanical load-bearing capacity.

Induction-sensitive components generally comprise an electrically conductive component such as a metal and/or carbon fiber. Mold parts and other components in the vicinity of the inductor which do not have to be heated are preferably substantially free of induction-sensitive components or are shielded from the induction field with a suitable shielding material.

In the method the preferably thermoplastic molded parts are generally provided with an electrically conductive component, for instance metal gauze, or this component is arranged between the molded parts. Foucault currents or eddy currents are induced in the electrically conductive component by a fluctuating electromagnetic field which is generated by an inductor supplied with alternating current by a generator. Owing to several heating mechanisms like the Joule effect, fiber junction heating and dielectric hysteresis, these Foucault currents generate the heat required to melt the thermoplastic material and/or activate the coupling means. By moving the inductor along the contact surfaces the first and/or second thermoplastic wall parts are mutually connected over their contact surface. The inductor can be guided over the contact surface for instance by means of a robot arm or linear guide, or any other moving means, in order to realize the connection.

For the purpose of heating, the induction-sensitive component may be in thermal contact with the thermally activated coupling means. This is for instance possible by mixing the induction-sensitive component and the coupling means.

An embodiment wherein the joining inductor is situated outside a mold and the electromagnetic field of the inductor reaches the contact surfaces between the first and/or second wall parts through a wall of the mold, allows bringing the wall parts together under pressure by the mold during welding. Other embodiments may apply pressure after the inductive heating of the molded parts for coupling has taken place.

It is advantageous if the thermally activated coupling means comprises a thermoplastic polymer, preferably a thermoplastic polymer matrix of the first and/or second wall parts. Thermoplastic polymers may be coupled in a simple manner by fusion. Furthermore, it is easy to mix a thermoplastic polymer with an induction-sensitive component such as metal gauze or carbon fibers. Examples of particularly suitable thermoplastic polymers include polyethylene, such as polypropylene, polyamide, polyetherimide (PEI), polyaryletherketone such as polyetherketoneketone (PEKK), polyetheretherketone (PEEK), and polyphenylene sulfide (PPS), although the method may be used for any other thermoplastic polymer as well.

The component heatable by induction preferably comprises carbon fibers and/or a metal. These materials can readily be heated by induction and also have, in addition to electrical conduction, a good thermal conduction, whereby the generated heat is well distributed. Carbon fibers incorporated in a thermoplastic polymer are recommended because the carbon fibers also improve the material strength. In another preferred embodiment of the method the component heatable by induction comprises ferromagnetic or carbon nanoparticles.

In a preferred embodiment the inductor is moved along a path determined by the position of the contact surfaces of the first and/or second wall parts. The partly assembled fuselage structure may then be held stationary. The inductor may be connected to an alternating current generator, wherein the alternating current generator is electrically connected to electrical connecting means of the inductor. Usable frequencies generally range from 0.1-10 MHz. The induction part may be provided with a feed channel adapted for passage of a cooling medium such as water, which may regulate the temperature of the induction part. A suitable induction part may for instance comprise a metal tube bent into the desired shape, through which the cooling medium is pumped.

The embodiments of the invention described in this patent application can be combined in any possible combination of these embodiments, and each embodiment can individually form the subject-matter of a divisional patent application.

BRIEF DESCRIPTION OF THE FIGURES

The invention will now be elucidated with reference to the following figures, without however being limited thereto. In the figures:

FIG. 1A schematically shows a perspective view of a fuselage structure according to the state of the art:

FIG. 1B schematically shows a cross-sectional view of the fuselage structure of FIG. 1A wherein the cross-section is taken in a plane extending parallel to a longitudinal axis of the fuselage structure;

FIG. 1C schematically shows a cross-sectional view of the fuselage of FIG. 1A wherein the cross-section is taken in a plane extending perpendicular to a longitudinal axis of the fuselage structure;

FIG. 2 schematically shows a perspective view of a fiber-reinforced composite skin panel in accordance with an embodiment of the invention;

FIG. 3 schematically shows a perspective view of a fiber-reinforced composite skin panel that is joined to another fiber-reinforced composite skin panel in accordance with an embodiment of the invention;

FIG. 4 schematically shows a perspective view of two fiber-reinforced composite skin panels that are joined to a frame element in accordance with an embodiment of the invention;

FIG. 5 schematically shows a cross-sectional view of an H-shaped frame element in accordance with an embodiment of the invention;

FIG. 6 schematically shows a perspective view of part of a fuselage structure in accordance with an embodiment of the invention;

DESCRIPTION OF EXEMPLARY EMBODIMENTS

Figure 7:
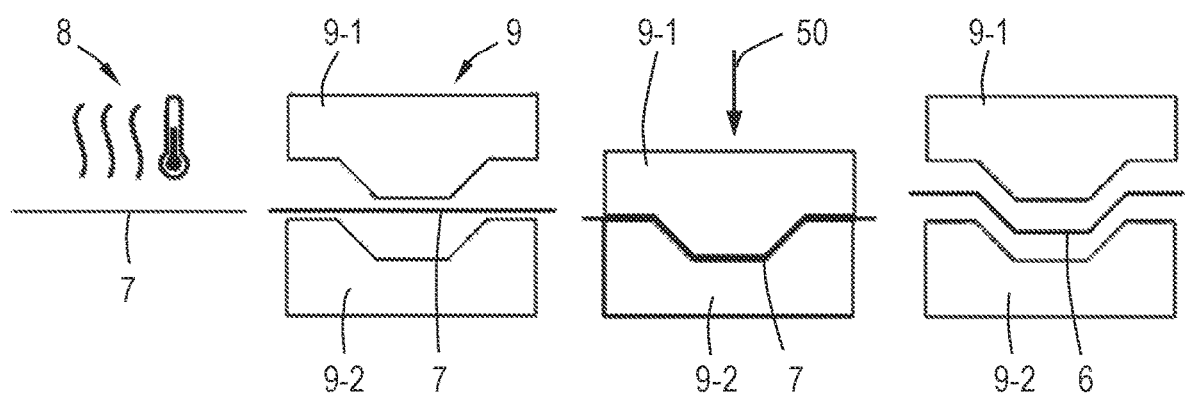
FIG. 7 schematically shows a side view of a device for manufacturing the fiber-reinforced composite skin panels in accordance with an embodiment of the invention.

Referring to FIG. 1, this disclosure relates to composite aircraft structures and more particularly to an aircraft fuselage structure 1 with a fuselage skin 2 made of aluminum or composite material. In the context of the present disclosure, the term "composite material" is intended to encompass fiber-reinforced composite materials (e.g., polymers) and advanced composite materials also known as advanced polymer matrix composites which generally comprise high strength fibers bound together by a matrix material or any known or other composite material(s) suitable for use in aircraft structural parts such as fuselage skins. Such composite materials may include fiber reinforcement materials such as carbon, aramid and/or glass fibers embedded into a thermosetting or thermoplastic matrix material. An exemplary fuselage structure 1 may be an aft fuselage section of an aircraft or any other portion of a fuselage structure 1 such as a cockpit section of fuselage for instance. The fuselage structure 1 may be a pressurized or non-pressurized section of fuselage. Fuselage structure 1 further comprises frame subassembly 3 comprising a plurality of frame elements 30. The frame elements 30 are preferably made of a fiber-reinforced composite material with a thermoplastic polymeric matrix, or may be made of a metallic material such as an aluminum-based alloy, a titanium-based alloy, steel or other suitable metallic material. When induction welding is used for connecting the composite skin panels 6 to metallic frame elements 30, the metal surfaces to be bonded or connected may require special surface preparation to ensure proper adhesion. The frame elements 30 may be interconnected though one or more longerons 4 to form the pre-assembled frame subassembly 3. The longerons 4 extend parallel to a longitudinal axis 11 of the fuselage structure 1. The frame elements 30 extend in a transverse plane 10 of the fuselage structure 1, which transverse plane 10 is perpendicular to the longitudinal axis 11 of the fuselage structure 1. Alternatively or in addition, one of more frame elements 30 may be positioned under an oblique angle relative to the longitudinal axis 11 of the fuselage structure. The frame elements 30 serve to provide support to an interior of the fuselage skin 2 and may be spaced apart along the longitudinal axis 11 of the fuselage structure 1. The relative spacing 31 of the frame elements 30 may be selected prior to assembly with the composite fuselage skin 2.

As also shown in FIG. 1, the fuselage structure 1 further comprises a number of stringers 5 that extend parallel to the longitudinal axis 11 of the fuselage structure 1 and penetrate the frame elements 30. The stringers 5 are generally less stiff as the longerons 4 and a number of these stringers 5 is provided between a pair of longerons 4. The purpose of the stringers 5 is to provide some shape stability, stiffness and buckling resistance to the fuselage skin 2 in between the longerons 4. As shown, the fuselage skin 2 is generally provided onto the structure consisting of frame elements 30, longerons 4 and stringers 5, and thereby provides a relatively smooth outer surface.

A fuselage skin 2 according to the state of the art may have a full barrel construction, which means that the fuselage skin 2 comprises a single piece that is closed in its circumferential direction and that extends completely around the longitudinal axis 11 of the aircraft. Such a composite skin 2 is typically manufactured using well known composite manufacturing methods such as automated fiber placement (AFP) or automated tape laying (ATL). Techniques such as ATL and AFP require large molds and use computer-guided robotics to lay one or several layers of reinforcing fiber tape or tows onto a mold or mandrel to form a part or structure. After tape-laying, the whole tape-laid structure is provided in an autoclave in order to harden the thermosetting matrix polymer of the tapes or tows. Autoclaving is typically performed under vacuum which requires wrapping the complete tape-laid structure in an air-impermeable foil. It goes without saying that autoclaving a complete tape-laid fuselage structure requirements large investments and is rather inefficient from an energetic and material waste point of view. However, no other manufacturing method has proven to be able to match the reliability of an autoclaved fuselage structure with a full barrel fuselage skin construction.

Referring now to FIG. 2, a fiber-reinforced composite skin panel 6 according to an embodiment of the present invention is shown. The panel 6 has two first side edges 60 that are each configured to be joined to a frame element 30 along a length 61 of said first side edges 60. A panel 6 thus extends between a pair of frame elements 30 and is connected thereto by a method that will be elucidated further below. The panel 6 further has two second side edges 62 that, in assembled state, extend in a direction parallel to the longitudinal axis 11 of the fuselage structure 1. An inner surface 63 of the panel 6 faces the inside of the assembled fuselage structure 1, while an outer surface 64 of the panel 6 forms part of an outer surface of the assembled fuselage skin 2. In order to accommodate the more or less cylindrical shape of an assembled fuselage skin 2, each composite skin panel 6 is curved around the longitudinal axis 11 with a radius of curvature R that may depend on the size of the aircraft and the number of panels 6 used to assemble the complete fuselage skin 2. The radius of curvature R may vary within a wide range, such as between 2 and 6 m. The second side edges 62 may be curved but preferably are substantially flat. The length 65 of a second side edge 62 also depends on the size of the aircraft and the relative spacing 31 of the frame elements 30.

The composite skin panel 6 of the invention further comprises a stiffener 66 integrally formed in each composite skin panel 6 and extending radially inwards from the inner surface 63, i.e. towards the longitudinal axis 11 of the fuselage structure 1. The stiffener 66 in the embodiment shown is hat-shaped with two upstanding walls 66-1 and a roof part 66-2. The stiffener 66 further extends along a line about parallel to the second side edges 62 of the panel 6 and to the aircraft longitudinal axis 11. The stiffener 66 in the shown embodiment has a hat-shaped cross-section. However this cross-section may have other shapes such as a H- or I-shape. For ease of manufacturing, a hat-shaped stiffener cross-section is preferred.

A way of providing the connection between a composite skin panel 6 and another composite skin panel 6 comprises joined second wall parts (67-1, 67-2) of both panels. The second wall parts (67-1, 67-2) extend about parallel to the second edges 62 of each panel 6 and comprise second wall parts 67-1 that are located in the vicinity or adjacent to the stiffener 66, and second wall parts 67-2 that are located at another side edge 62 of the panel 6, as shown in FIG. 2 for instance. In order to join two panels, the wall parts 67-1 of on panel 6 are brought in overlapping arrangement with the wall parts 67-2 of another panel 6, as shown in the top part of FIG. 3. In order for maintaining a flush outer surface 64 of the assembled fuselage skin 2, a second wall part 67-1 of one composite skin panel 6 comprises a joggle 68 adjacent to the stiffener 66. The joggle 68 extends along the second side edge 62 and permits a second wall part 67-2 of another composite skin panel 6 to overlap with the second wall part 67-1 and yet maintain a flush outer surface 64 between the two panels 6. The cooperating second wall parts (67-1, 67-2) are brought against each other and joined by any means, such as by mechanical bonding, adhesive bonding or induction welding bonding, the latter being preferred as will be elucidated further below.

First wall parts 69-1 and 69-2 extend about parallel to the first edges 60 of each panel 6 and comprise first wall parts 69-1 that are located at one first side edge 60, and first wall parts 69-2 that are located at an opposite first side edge 60 of the panel 6, as shown in FIG. 2 for instance. The first wall parts (69-1, 69-2) are configured to be joined to first wall parts (30-1, 30-2) of a frame element 30, as shown in FIG. 4. In the embodiment shown in FIGS. 4 and 5, the frame element 30 has an I-shaped cross-section and comprises two U-segments, positioned with their back webs (31-1, 31-2) against each other to form an I-shaped frame element 30, comprising a web plate (31-1, 31-2) and two flanges (30-1, 30-2) and (32-1, 32-2). Each flange may be covered with an additional flange plate (33-1, 33-2), if required. The flange plate 33-1 is positioned closer to the outside of the fuselage skin 2, while the flange plate 33-2 is positioned such that it points towards the inside of the fuselage skin 2 and the longitudinal axis 11. The different components (30, 31, 32) of a frame element 30 may be connected to each other by any means such as by mechanical bonding, adhesive bonding or induction welding bonding, the latter being preferred.

As shown in FIG. 4, the first wall parts (69-1, 69-2) of a composite skin panel 6 are joined to the first wall parts (30-1, 30-2) of the outer flange of the frame element 30. This preferably done such that the first wall parts (69-1, 69-2) of the composite skin panel 6 are located more radially inwards than the first wall parts (30-1, 30-2) of the frame element 30 to which it is joined. This may help in preventing failure between the first wall parts (69-1, 69-2) and (30-1, 30-2). Indeed, a pressurized fuselage will exert a pressure P from the inside to the outside onto the fuselage skin 2 (and fuselage skin panels 6) as shown in FIG. 4. This pressure P will tend to compress the first wall parts (69-1, 69-2) of a panel 6 and the first wall parts (30-1, 30-2) of a frame element.

The first wall parts (69-1, 69-2) of the composite skin panel 6 preferably also comprise a side edge joggle 70 provided at a side edge 60 of the composite skin panel 6. This side edge joggle 70 permits the first wall parts (30-1, 30-2) of the frame element (30) to overlap the composite skin panel's first wall parts (69-1, 69-2) while maintaining a flush outer surface 64 of the fuselage skin 2.

With reference to FIG. 6, a part 2a of a fuselage skin 2 according to an embodiment of the invention is shown. The skin part 2a is shown from the inside and comprises a curved frame element 30 having a radius of curvature R that corresponds to the radii of curvature R of each composite skin panel 6. A number of such panels 6 is connected to the frame element 3 along first edges 62, as has been described above. For clarity, the opposite first edges 62 are shown to be not connected to a frame element 30. However, to build a fuselage skin 2 these opposite first edges 62 are in reality connected to other frame elements 30, spaced at a distance 31 from an adjacent frame element 30. As also shown, the number of panels 6 that may be arranged between frame elements 30 may vary, for instance by adopting different panel lengths 61 in a direction transverse to the longitudinal axis 11 of the fuselage structure 1. In the embodiment shown, the panels 6 below the frame element 30 are twice as small as the panels 6 above said frame element 30.

In the assembled fuselage part 2a, the stiffeners 66 of the composite skin panels 6 are aligned with one another in a direction parallel to the fuselage structure 1 longitudinal axis 11.

Referring to FIG. 9, several embodiments of stiffeners 66 are schematically shown, and in particular the way in which they may be connected to other parts of the fuselage structure 1, such as frame elements 30. In conventional fuselage structures 1, the stringers 5 generally run along the complete length of the fuselage structure 1 and extend trough the frame elements 30. According to the invention in which the panels 6 comprise integrally formed stiffeners 66, it is inevitable that these stiffeners 66 may not be much longer than the distance 31 (or pitch length) between two frame elements 30. The intermittent stiffeners 66 may be aligned to form a pseudo-stringer structure but may provide a less favorable buckling resistance to the fuselage skin 2 than the conventional continuous stringer 5. To at least partly overcome this disadvantage, a number of stiffener 66 designs are proposed. In the stiffener designs shown in FIGS. 9C and 9E, each stiffener 66 is connected to a frame element 30, either by a separate connector 90, or by providing the stiffener 66 with connector lips 91, as shown. In the designs shown in FIGS. 9A and 9B, the stiffener 66 does not directly connects to the frame element 30, but rather through the first wall parts (69-1, 69-2) of the panel 6.

Besides the composite skin panels 6, the frame elements 30 may also be made of a fiber-reinforced composite material having a thermoplastic matrix, such as a carbon/PEEK composite material for instance.

Figure 10:
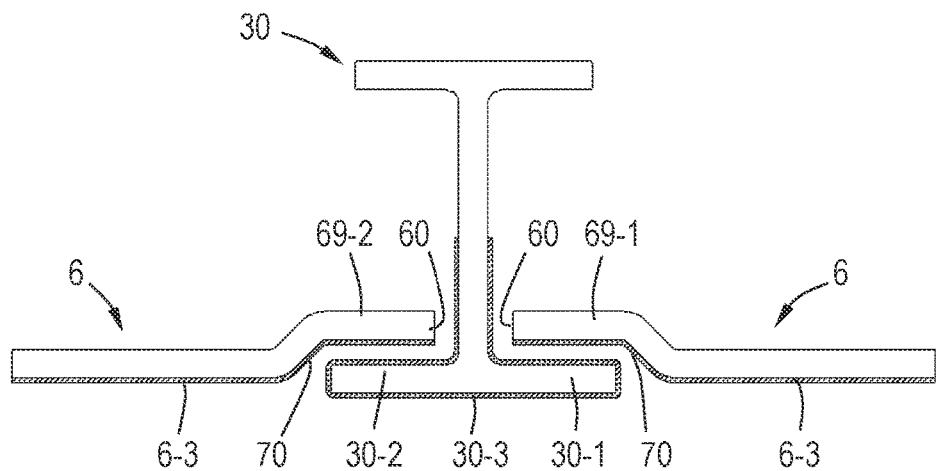

As shown in the cross-sectional view of FIG. 10, the first wall parts (69-1, 69-2) of a composite skin panel 6 are joined to the first wall parts (30-1, 30-2) of the outer flange of the frame element 30. This is preferably done such that the first wall parts (69-1, 69-2) of the composite skin panel 6 are located more radially inwards than the first wall parts (30-1, 30-2) of the frame element 30 to which it is joined, for the reasons given above. As with the embodiment shown in FIG. 4, the first wall parts (69-1, 69-2) of the composite skin panel 6 preferably also comprise a side edge joggle 70 provided at a side edge 60 of the composite skin panel 6. This is to allow the first wall parts (30-1, 30-2) of the frame element (30) to overlap the composite skin panel's first wall parts (69-1, 69-2) while maintaining a flush outer surface 64 of the fuselage skin 2. In the embodiment shown, an outer surface of (part of) the frame element 30 and of each panel 6 is provided with a conducting structure or material, such as a metal mesh (30-3, 6-3). This allows the connection between the first wall parts (69-1, 69-2) of each composite skin panel 6 and the first wall parts (30-1, 30-2) of the outer flange of the frame element 30 to be made by induction welding. At the same token, the outer surfaces, comprising the conducting structure or material in the form of a metal mesh (30-3, 6-3), are made electrically conducting, which provides protection against lightning strike.

The fiber-reinforced composite skin panels 6 may conveniently be made by press forming. Referring to FIG. 7, a number of carbon fiber unidirectional tapes having a thermoplastic polymer matrix such as PEEK is cut to size and stacked into a desired layup 7, such as a [+45°/−45°/0°/90°]$_s$ layup 7. The layup 7 may be sandwiched between two metal plates (not shown) and a vacuum is applied between the plates to reduce trapped air, while the atmospheric pressure compresses the layup 7 somewhat. The layup 7 is then transferred into an oven 8 in which the thermoplastic polymer matrix is allowed to melt, which enhances flow of matrix polymer between the tapes and helps in fusing the same. The layup 7' is transferred to a pre-heated mold 9 provided at a temperature below the softening temperature $T_s$ of the thermoplastic matrix polymer. The mold 9 comprises a male mold part 9-1 and a shape-matched female mold part 9-2, both of which mold parts (9-1, 9-2) are brought together and pressed against each other with a pre-determined force 50, which is held until the laminate is again cooled to a temperature below the glass transition temperature $T_g$ of the matrix polymer of the produced panel 6 by conduction heat to the cooler molds. The shape of the panel 6 is now consolidated and the edges of the panel 6 may be trimmed to size. The need for only one pair of relatively small mold parts (9-1, 9-2) may significantly reduce production and investment costs. Suitable panels 6 may be mostly single-curved, which reduces the risk of having misaligned fibers in the panels 6 as produced.

A method for manufacturing a fuselage structure 1 of an aircraft using the invention provides a plurality of frame elements 30 spaced apart from one another over a distance 31 in a direction parallel to the longitudinal axis 11 of the aircraft or fuselage structure 1. The frame elements 30 each extend in a plane 10 that is about perpendicular to the longitudinal axis 11. A plurality of fiber-reinforced composite skin panels 6 is provided between each pair of frame elements 30. The panels 6 are oriented such that a stiffener 66 formed in each composite skin panel 6 extends radially inwards from an inner surface 63 of each composite skin panel 6 and in a direction parallel to the aircraft longitudinal axis 11, as for instance shown in FIG. 6. The plurality of fiber-reinforced composite skin panels 6 is then interconnected by joining second wall parts (67-1, 67-2) of each composite skin panel 6 to second wall parts (67-1, 67-2) of another composite skin panel 6. In this manner, an integrated fuselage skin part 2a may be formed between each pair of frame elements 30. The process also requires connecting the plurality of fiber-reinforced composite skin panels 6 to each pair of frame elements 30 by joining first wall parts (69-1, 69-2) of each composite skin panel 6 with first wall parts (30-1, 30-2) of each frame element 30. The above steps may be repeated for each pair of frame elements 30 until a fuselage skin 2 is formed, extending along the longitudinal axis 11 of the fuselage structure 1 and enclosing an inner space thereof.

Figure 8:
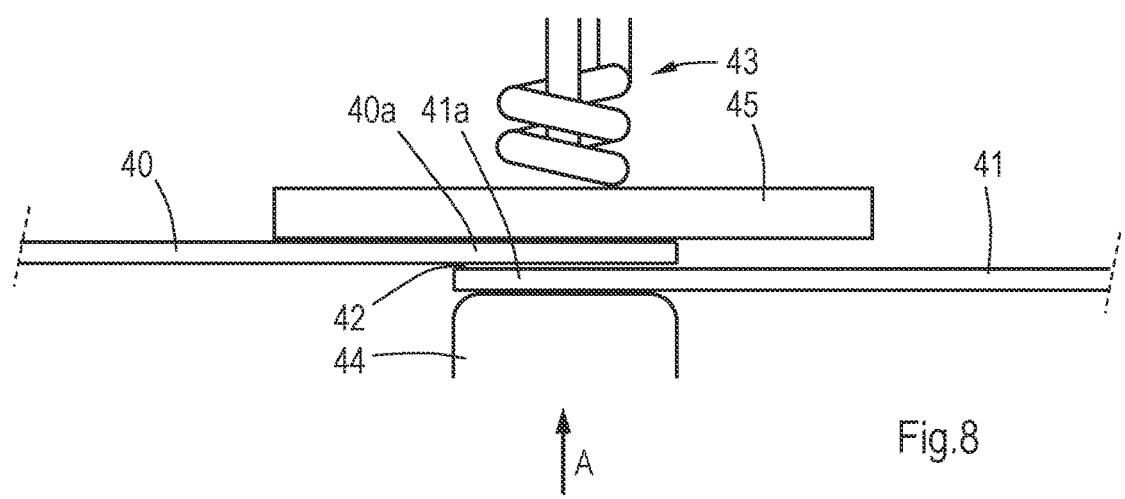
FIG. 8 schematically shows a cross-sectional side view of a tooling used in electromagnetic welding of fiber-reinforced composite skin panels to each other or to a frame element in accordance with an embodiment of the invention.
Figure 9A:
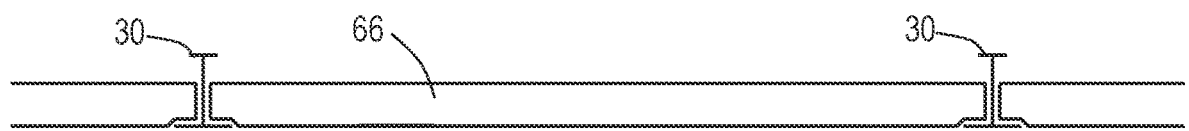
FIG. 9 schematically shows several stiffener designs in accordance with embodiments of the invention; and finally FIG. 10 schematically shows a cross-section of two fiber-reinforced composite skin panels that are joined to a frame element in accordance with yet another embodiment of the invention.
Figure 9B:
Figure 9C:
Figure 9D:
Figure 9E:

A preferred manner to connect the fiber-reinforced composite skin panels 6 to each other and/or to each pair of frame elements 30 comprises electromagnetic welding, as schematically shown in FIG. 8. The molded parts (40, 41) shown in FIG. 8 may comprise two fiber-reinforced composite skin panels 6, a fiber-reinforced composite skin panel 6 and a frame element 30, or two stiffeners 66.

The molded parts (40, 41) preferably are to be connected by electromagnetic welding. As referred to elsewhere, both molded parts (40, 41) are preferably manufactured from a thermoplastic matrix polymer reinforced with carbon fibres, wherein the carbon fibres also serve as induction-sensitive component for heating of the thermoplastic polymer matrix for the purpose of welding. The molded parts (40, 41) need to be joined along molded wall parts (40a, 41a) that are brought together to define a common contact surface 42 for coupling. An inductor 43, which may for instance be a linear inductor 43 that provided a substantial cylindrical electromagnetic field heats the molded wall parts (40a, 41a) and their common contact surface 42 to a temperature which is high enough to thermally activate the thermoplastic matrix polymer, or, optionally, a thermally activated adhesive applied to the contact surface 42. The inductor may be moved along the wall parts (40a, 41a) without making physical contact with the wall parts (40a, 41a). During heating and/or optionally a short time thereafter, the thermally activated contact surface 42 is compressed in the direction A by appropriate tooling, comprising a clamping tool 44 and a static plate 45 provided on top of the wall parts (40a, 41a). A well developed and strong connection between the molded parts (40, 41) may be made in this way.

The invention is not limited to the above given examples and variations thereto may be envisaged within the scope of the appended claims.

The invention claimed is:

1. A fuselage structure of an aircraft comprising:
    a fuselage skin, extending along a longitudinal axis of the aircraft and enclosing an inner space, further having an inner surface facing the inner space, and
    a plurality of frame elements spaced apart from one another in a direction parallel to the aircraft longitudinal axis and extending in a circumferential direction along the inner surface of the fuselage skin to support the fuselage skin,
    wherein the fuselage skin comprises a plurality of fiber-reinforced composite skin panels that are interconnected via second wall parts of said composite skin panels, and that extend between each pair of frame elements, wherein first wall parts of a composite skin panel are connected with first wall parts of a frame element, wherein the composite skin panels further comprise a stiffener integrally formed in each composite skin panel and extending radially inwards from the inner surface, wherein the stiffeners extend in a direction parallel to the aircraft longitudinal axis, wherein the first wall parts of the composite skin panels are located more radially inwards than the first wall parts of the frame elements to which they are joined, and wherein at least some of the first wall parts of the composite skin panels and the frame elements and/or at least some of the second wall parts of the composite skin panels are joined through an induction welded connection; and wherein the connection between a composite skin panel and another composite skin panel comprises joined second wall parts of both, wherein the second wall part of one composite skin panel comprises a joggle adjacent to the stiffener, the joggle permitting the second wall part of the composite skin panel to overlap with the other composite skin panel's second wall part while maintaining a flush outer surface of the fuselage skin.

2. The fuselage structure according to claim 1, wherein the frame elements have an I-shaped or H-shaped cross-section, and the first wall part of the frame element comprises a flange of the I- or H-shaped frame element.

3. The fuselage structure according to claim 1, wherein the first wall part of the composite skin panel comprises a side edge joggle provided at a side edge of the composite skin panel, the side edge joggle permitting the first wall part of the frame element to overlap the composite skin panel's first wall part while maintaining a flush outer surface of the fuselage skin.

4. The fuselage structure according to claim 1, wherein all of the first and/or all of the second wall parts are joined through an induction welded connection.

5. The fuselage structure according to claim 1, wherein the stiffeners of composite skin panels are connected through an induction welded connection to each other to form a continuous stringer.

6. The fuselage structure according to claim 1, wherein the fiber-reinforced composite skin panels and/or the frame elements are made of a fiber-reinforced composite material having a thermoplastic matrix.

7. An aircraft comprising the fuselage structure according to claim 1.

8. A method for manufacturing a fuselage structure of an aircraft, comprising:

providing a plurality of frame elements spaced apart from one another in a direction parallel to the longitudinal axis of the aircraft and extending in a circumferential direction of the aircraft;

providing a plurality of fiber-reinforced composite skin panels to extend between each pair of frame elements, such that a stiffener integrally formed in each composite skin panel extends radially inwards from an inner surface of each composite skin panel and in a direction parallel to the aircraft longitudinal axis;

interconnecting the plurality of fiber-reinforced composite skin panels by joining second wall parts of composite skin panels; and to form an integrated fuselage skin part between each pair of frame elements;

connecting the plurality of fiber-reinforced composite skin panels to each pair of frame elements by joining first wall parts of each composite skin panel to first wall parts of each frame element; and repeating the above steps for each pair of frame elements until a fuselage skin is formed, extending along a longitudinal axis of the aircraft and enclosing an inner space thereof, and being supported by the plurality of frame elements, wherein the first wall parts of the composite skin panels are located more radially inwards than the first wall parts of the frame element to which they are joined, wherein at least some of the first wall parts of the composite skin panels and the frame elements and/or at least some of the second wall parts of the composite skin panels are joined through an induction welded connection, and wherein further a composite skin panel is connected to another composite skin panel by joining second wall parts of both, wherein the second wall part of a composite skin panel comprises a side edge joggle provided at a side edge of the composite skin panel, and the second wall part of the other composite skin panel is brought in overlapping arrangement with the composite skin panel's second wall part to permit maintaining a flush outer surface of the fuselage skin.

9. The method according to claim 8, wherein the frame elements have an I-shaped or H-shaped cross-section, and the first wall part of the frame element comprises a flange of the I- or H-shaped frame element.

10. The method according to claim 8, wherein the first wall part of the composite skin panel comprises a side edge joggle provided at a side edge of the composite skin panel, and the first wall part of the frame element is brought in overlapping arrangement with the composite skin panel's first wall part to permit maintaining a flush outer surface of the fuselage skin.

11. The method according to claim 8, wherein all of the first and/or all of the second wall parts are joined through an induction welded connection.

12. The method according to claim 11, wherein the first and/or second wall parts are made of a fiber-reinforced composite material having a thermoplastic polymer matrix, and wherein joining the first and/or second wall parts is achieved by a method comprising pressurizing contact surfaces of the first and/or second wall parts to be joined, moving an inductor along the pressurized contacted surfaces of the first and/or second wall parts, generating an electromagnetic field in an induction-sensitive component, selected from carbon fibers, a metal or metal mesh, ferromagnetic particles, or combinations of these, of the first and/or second wall parts to heat the thermoplastic polymer of the first and/or second wall parts to above a melting temperature of the thermoplastic polymer, and connecting the contact surfaces of the first and/or second wall parts to each other by the molten thermoplastic polymer.

13. The method according to claim 8, wherein the stiffeners of composite skin panels are connected to each other through an induction welded connection to form a continuous stringer.

* * * * *